(12) United States Patent
Templeman

(10) Patent No.: X923
(45) Date of Patent: Aug. 16, 1808

(54) BRIDGES, CHAIN,(IMPROVEMENT FINLEY)

(76) Inventor: John Templeman

John Templeman
Letters Patent
Issued Aug. 16. 1808.

The Schedule referred to in these Letters Patent and making part of the same containing a description in the words of the said John Temple-man himself of his improvements and applications to James Finlays Chain Bridge Improvement the first. When the scale is too wide for one span for the chains [illegible] the uprights that stand on the abutments in the manner as described by the above patent and let them rest in the middle of the curve on the Pier with-out any upright. hang the chains at first within 12 to 18 inches of the top of the Pier. And when the bridge is floored block up to it with square timber till it takes a proper bearing. Go on with the suspenders and joists as de-scribed by the above Patent and extend the floor from one abutment to the other In this case the uprights will require to be higher than in Judge Finlays plan Improvement the second. Where it may be preferred to an upright on the Pier instead of the foregoing method the Pier must be constructed in such way as to have strength enough to support the weight of [illegible] may be on one span while the opposite span has nothing on it, in such cases great strength and perfect solidity are indispensably necessary. Where a Pier can be built on from natural rock from four to six bars of iron 4 inches wide and one thick are to be planted firmly in the natural rock, and at the distance of every four or 5 feet holes of inch square must be made through the flat bars and bars of inch square iron 4 feet long are to be run through them in such a manner as to take a strong cross hold of the mason work inside of the Pier These flat bars of iron are to extend up and come out at the top of the Pier about two feet and then pass through the sills of the upright and then down in such a manner as to bind the upright to the Pier in a more powerful way. Above the sills there is to be a hole in the head of the bars of an inch square from where a Chain or bar of iron is to be extended up to the arms of the cross pieces. Besides these powerful supports to the upright there are bars of flat iron to come up the sides of the pier and bolt to the sills of the upright under the middle of the

[illegible] of the bridge And there is also [illegible] a further [illegible] [illegible]
by me for this purpose that is to plant the ends of the iron bars in the natural
rock and carry the bars up the Pier and to the top of the upright and extend
them over the cap piece and down on the opposite sides and fasten the ends to the
natural rock bolting and spiking as you go [illegible] of a Pier which is intended
to support an upright which upright is to support the span is to be built on
[illegible] or gravel bottom [illegible] [illegible] strong timber are to be laid across at
bottom of the Pier [illegible] sunk and a [illegible] square [illegible] feet long to which
the flat bars are to be attached, but if the bottom should be sand and it should
be necessary to build the Pier with timber crossed and piles driven in each check
or [illegible] in which case the iron either in bars or chains are to be attached to the ties at the
bottom of the Pier and then brought up a short distance and made fast to the
flat bars which are to continue up the sides of the Pier and which may then be
bolted to the timbers to serve the double purpose of strength to the Pier and uprights;
The ends of the bars in this case will go up on the outside of the upright and
bolt to it, but care must be taken to leave the chains from the [illegible] of the cross
pieces [illegible] with these bars. My uprights are covered which make them
look well and answer the invaluable purpose of preserving the timber [illegible]
times longer than without cover. Besides the above advantages of strength I
have invented a way to apply check and brace chains to keep the [illegible] [illegible]
bridges more steady and floors more solid as well as also to afford an
additional strength to the uprights, and as the Bridges that are now built
on the Chain principle seem to be much complained of for want of solidity
I have applied the post and brace or what some call the King post prin-
ciple to the railings which while it affords great additional solidity to the
floor also affords great support to the Chains by dispersing the weight and
equalizing it. Besides the above mentioned improvements and applica-
tion I have invented an entire New Chain Bridge with a method of
suspending ropes or Cables of Hemp or of Wire made fast into Cords and then
into Rope and then into Cable or iron Chain [illegible] ways. The ropes of
Wire are intended to counteract or avoid the effect of Frost on the Chains
as it is possible that in very cold Climates the frost may render the Chains
unsafe. The wire ropes are to be well oiled and covered with oil-Cloth and

[illegible] with spun yarn and at the distance of every 8 or ten feet they are
to have [illegible] pieces of [illegible] of six inches long and half an inch thick [illegible]
[illegible] at the time of laying the rope to keep the suspenders at proper distances
[illegible] principle of [illegible] ropes or chains will afford a more solid and sturdy
[illegible] than the [illegible] and will be much less resistance to [illegible]
[illegible] its principles in bearing and supporting an upright [illegible]
[illegible] to resist the weight of the [illegible] and to support itself against one
[illegible] the [illegible] in the [illegible] [illegible] and [illegible]
[illegible] these chains are to be [illegible] with links of [illegible] bar and not as [illegible]
[illegible] with the [illegible] the formation of a [illegible] chain bridge with
[illegible] determined also an improvement in [illegible] Finlays plan of
[illegible] that is to have the uprights higher in proportion to the length
[illegible] and not let the lower part of the chain [illegible] the upper part
[illegible] but to let the lower part or middle [illegible] the [illegible]
[illegible] the tops of the [illegible] of the piers and abutments; and [illegible] then let the
[illegible] 8 inches in the middle and [illegible] against the
abutments and piers and in this state the [illegible] chains that are [illegible]
from the middle of the [illegible] chains to the abutments or piers will [illegible] in a
[illegible] manner to support the middle upright Witnesses
Thomas [illegible]
[illegible] [illegible]

[illegible]

[illegible]